United States Patent

[11] 3,634,881

[72] Inventor Thomas A. Cline
1415 Atlantic Drive, Columbia, S.C. 29201
[21] Appl. No. 71,856
[22] Filed Sept. 14, 1970
[45] Patented Jan. 11, 1972

[54] HIGH-PRESSURE AND LOW-PRESSURE WARNING SYSTEM FOR AUTOMOTIVE RADIATORS AND THE LIKE
10 Claims, 1 Drawing Fig.

[52] U.S. Cl.................................................. 340/60, 340/52 F
[51] Int. Cl..................................................... B60q 1/26, G08b 21/00
[50] Field of Search.......................................... 340/52, 52 F, 57, 59, 60, 228

[56] References Cited
UNITED STATES PATENTS

| | | | |
|---|---|---|---|
| 2,834,953 | 5/1958 | Bechberger et al. | 340/60 X |
| 3,302,171 | 1/1967 | Sensing | 340/57 |
| 1,773,756 | 8/1930 | Schlaich | 340/57 |
| 1,704,488 | 3/1929 | Schlaich | 340/57 |
| 1,653,685 | 12/1927 | Whittington | 340/57 X |

Primary Examiner—Alvin H. Waring
Attorney—B. P. Fishburne, Jr.

ABSTRACT: An automotive radiator or the like is equipped with high-pressure and low-pressure sensing switches. The closing of either switch will initiate the sounding of a buzzer and flashing indicator light in the driver's compartment to indicate excessive radiator pressure or loss of pressure. The system is activated by closing of the ignition switch and a liquid coolant temperature sensing switch in the system remains open and blocks the passage of current to the low-pressure radiator switch until the coolant temperature rises to a point at which normal radiator pressure is achieved. This feature prevents premature and continuous activation of the buzzer and indicator light due to closure of the low-pressure radiator switch.

PATENTED JAN 11 1972   3,634,881
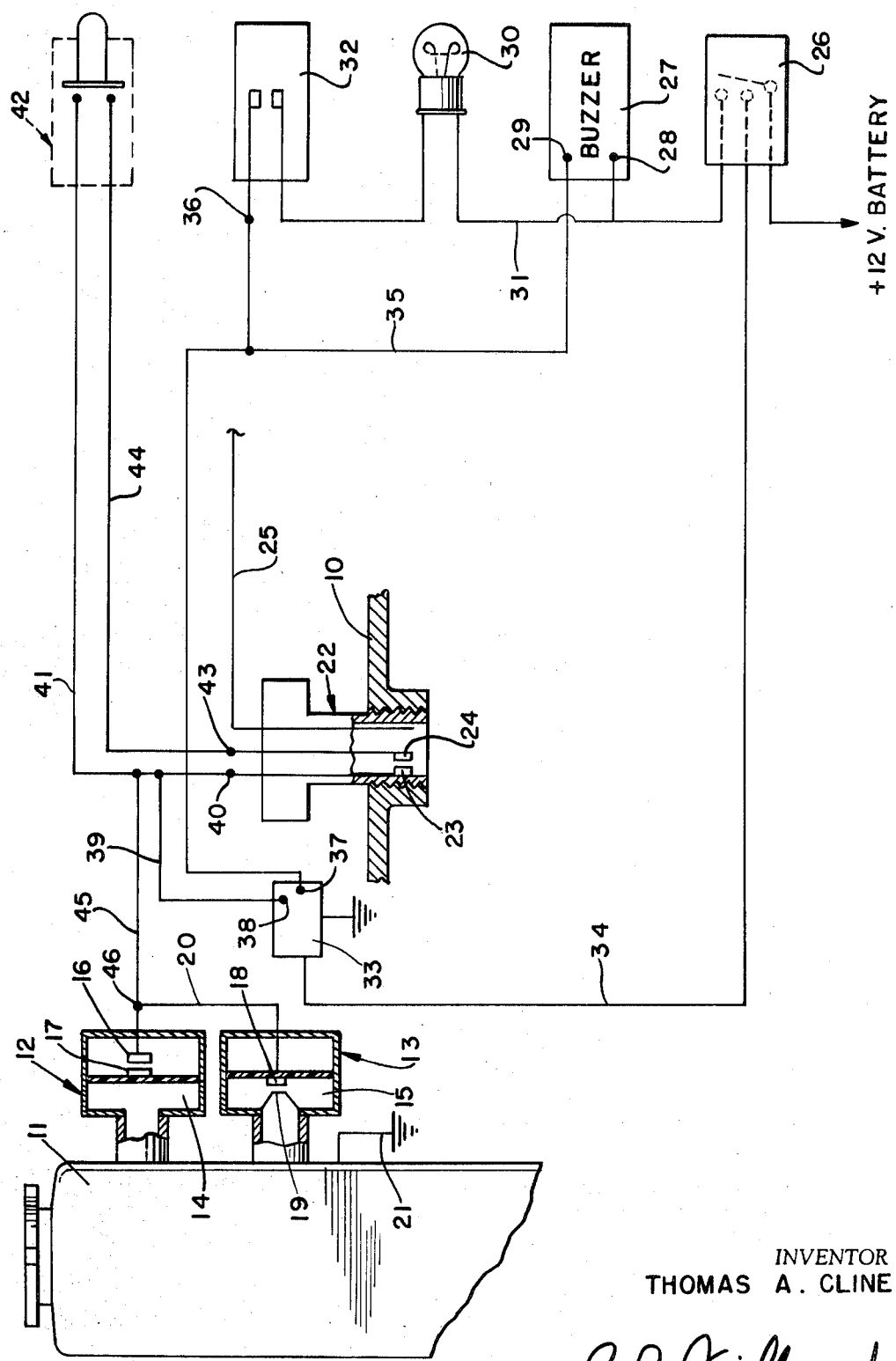
INVENTOR
THOMAS A. CLINE
BY B.P. Fishburn Jr.
ATTORNEY

3,634,881

HIGH-PRESSURE AND LOW-PRESSURE WARNING SYSTEM FOR AUTOMOTIVE RADIATORS AND THE LIKE

Devices are known in the prior art for sensing and indicating radiator coolant temperature, engine oil pressure, fuel level and the like. One example of such a warning system for motor vehicles is contained in U.S. Pat. No. 3,509,529. Some other pertinent prior art systems are contained in U.S. Pats. No. 1,653,685 to Whittington; No. 3,302,171 to Sensing; and No. 1,478,090 to Wood. While such prior art patented systems have a very broad relation to the invention, no known device provides for the automatic sensing and indication of excessive pressure and loss of normal pressure in a liquid-cooled engine, such as an automobile engine. The present invention has this capability plus other convenience features which will be readily apparent in the detailed description to follow. The invention features a first normally open pressure-responsive switch on the radiator tank which will close to complete a circuit through the alarm or warning means when radiator fluid pressure exceeds a predetermined normal degree. A second and independent pressure-responsive switch on the radiator remains open under the influence of normal radiator pressure but closes to activate the indicator means whenever radiator pressure drops below normal limits. A temperature-sensing switch in the circuit prevents premature activation of the audible and visual indicator means prior to the building up of normal pressure in the radiator. Both the high-pressure and low-pressure radiator switches thus activate the same audible and visual indicator devices at the proper times and under the proper high-pressure and low-pressure conditions in the radiator which require warning the operator. Circuit-testing means to indicate the operability of the system are also included.

The system is applicable to vehicles whose engines are cooled with water and/or antifreeze solutions regardless of the amounts of such solutions. The system will indicate, before damage is done to the engine, substantially any failure of the cooling system, such as an absent or loose radiator cap, a slow leak which causes high pressure, a defective or sticking thermostat or a clogged radiator or block. All of these defects just mentioned will cause excessive radiator pressure. A defective hose or a ruptured hose, on the other hand, will cause a rapid loss of pressure to a point below normal which will be detected almost instantly by the invention. Slow leaking water pumps will be detected. Therefore, the invention has great versatility and responds to a need not heretofore dealt with in the prior art.

BRIEF DESCRIPTION OF DRAWING FIGURE

The FIGURE of the drawing is a schematic view of the high- and low-pressure warning system for automotive radiators or cooling systems embodying the invention.

DETAILED DESCRIPTION

Referring to the drawings in detail wherein like numerals designate like parts, the numeral 10 designates a fragmentary portion of an internal combustion engine block of the liquid cool type having a cooling system which includes the usual radiator 11. The engine, radiator and the entire cooling system are conventional and typical of the cooling systems on most automobiles.

The high- and low-pressure warning system for the radiator forming the subject matter of the invention comprises a high pressure sensing switch 12 and an independent low pressure sensing switch 13 mounted directly on the radiator 11 and each having pressure chambers 14 and 15 in direct communication with radiator pressure. In practice, the pressure sensing switches 12 and 13 are secured to a plate in the top tank or side tank of the radiator and the location of the two switches may vary somewhat depending on the make and model of the vehicle. The high-pressure switch 12 has a fixed contact 16 and a movable contact 17. These contacts are normally separated and become closed to initiate the action of warning means to be described only when radiator pressure exceeds prescribed limits. The lower pressure switch 13 also has movable and fixed contacts 18 and 19 which remain separated while normal or prescribed pressure is maintained in the radiator, and these contacts are closed whenever radiator pressure is absent or drops below normal limits. The contacts 16 and 18 are connected in parallel by a wire 20 and both switches and the associated circuit are grounded as indicated at 21.

The warning system also embodies a coolant temperature sensing switch 22 mounted on the engine block 10 so as to be capable of detecting directly the temperature of the coolant in the block passages. This temperature switch embodies a pair of contacts 23 and 24 which remain open when the engine is cold, as immediately after starting, and which close when the temperature of the coolant approaches normal operating limits. As will be fully explained, the temperature switch 22 prevents premature and continuous operation of the audible and visual signal elements in the driver's compartment prior to engine warming up and prior to developing normal pressure in the radiator 11. Until these conditions prevail, the contacts 23 and 24 will remain open and block the passage of current to the low-pressure switch 13, whose contacts are closed until normal pressure is developed in the radiator 11. A lead wire 25 extends from the switch 22 to the conventional red warning light on the vehicle instrument panel, not shown, which indicates excessive engine temperature. The normal operation of this warning light is not interfered with by the invention.

The warning system further comprises in combination with the vehicle ignition switch 26 a buzzer 27 whose terminals 28 and 29 are connected in series with the ignition switch contacts. The ignition switch 26 is connected with the storage battery in the usual manner.

A signal or indicator light bulb 30 is also connected directly with the contacts of the ignition switch by a wire 31 and the buzzer and light bulb are connected in parallel, as shown. A conventional flasher unit 32 is also connected in series with the indicator light bulb so that the latter, whenever activated, will blink intermittently while the buzzer is sounding. The light bulb and buzzer are located physically in the driver's compartment, preferably on the instrument panel.

An optional small relay 33 is provided connected by a wire 34 with the start terminal of the ignition switch 26. Another wire 35 interconnects the terminal 29 of the buzzer and a corresponding terminal 36 of the flasher unit 32 with a terminal 37 of the relay 33. An opposite terminal 38 of this relay is electrically connected by the wire 39 with a terminal 40 of temperature switch 22, and a lead wire 41 extends from the terminal 40 to a system test switch 42 on the vehicle instrument panel or the like. This test switch is connected back to the opposite terminal 43 of the temperature switch 22 by a wire 44. Another wire 45 serves to interconnect the terminal 46 of radiator high-pressure switch 12 with the wire 41, as shown.

The operation of the high- and low-pressure warning system for radiators is as follows. When the ignition switch 26 is closed, 12 volts from the storage battery will flow to the buzzer 27 and to the indicator light 30 and flasher 32 in parallel with the buzzer. From the buzzer terminal 29, current will also flow through wire 35, relay 33 and wire 39 to temperature switch contact 23. At this time, the engine is cold and the contacts 23 and 24 are open and will interrupt the flow of current to the low-pressure switch 13 until the temperature of the coolant reaches a predetermined normal level. At this time, the contacts 23 and 24 will close and complete a circuit through wires 44, 41 45 and 20 to the high-pressure and low-pressure switches 12 and 13. By the time the coolant temperature has risen to the point where the switch contacts 23 and 24 close, as stated, sufficient pressure in the radiator 12 will be developed to separate the low pressure switch contacts 18 and 19. The high-pressure switch contacts 16 and 17 are always open until excessive pressure above normal limits develops in the radiator 11. Therefore, the temperature switch 22 serves to prevent premature and continuous activation of the elements 27 and 30 immediately after starting the engine while the coolant is cold and with no pressure in the radiator 11 and the contacts 18 and 19 closed. Were it not for the switch 22, the buzzer 27 and blinking light bulb 30 would operate immediately and continuously and falsely when the ignition switch 26 is first closed to start the engine and thereafter until the temperature reaches predetermined limits.

After such temperature limits are reached and the contacts 23 and 24 are closed and remain closed, the buzzer 27 and blinking light 30 will be activated simultaneously whenever radiator pressure drops sufficiently due to any cause to close low-pressure switch contacts 18 and 19. This could be due to a ruptured hose, large radiator leak, or loose or absent radiator cap. Likewise, if radiator pressure exceeds allowable limits as by a stuck thermostat, clogged block or radiator, or a slow leak in the system, the high-pressure switch contacts 16 and 17 will close with the identical result of sounding the buzzer 27 and activating the blinking light 30 close to the driver.

When the ignition switch 26 is closed, a circuit will also be established through the wire 34 and small relay 33 to indicate automatically whether or not the warning system is operational. The optional test switch 42, a separate switch, can be manually closed at any time by the driver to test the operability of the warning system. These features or refinements may be limited in some instances but the system will always function in the manner described to detect and indicate excessive radiator pressure or abnormally low pressure due to a variety of causes. The system is very simple and economical and essentially automatic. Its installation requires only very minor modification of conventional structure.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A high and low radiator pressure warning system comprising in combination with an automotive ignition circuit and liquid cooling system, separate high- and low-pressure-detecting switches on the radiator, an audible signal device and indicator light in the ignition circuit, a temperature-sensing switch positioned to detect the temperature of engine coolant and being open until the coolant reaches a predetermined level, circuit means electrically interconnecting said audible signal device and indicator light with said high- and low-pressure-detecting switches, and said temperature-sensing switch intervened in said circuit means between said audible signal device and indicator light and said high- and low-pressure-detecting switches.

2. The structure of claim 1, and said high- and low-pressure-detecting switches on the radiator electrically connected in parallel and both electrically connected with a contact of the temperature-sensing switch, the contacts of the high-pressure switch closing only in response to excessive radiator pressure above a normal range, and the contacts of the low-pressure switch closing only in response to a loss of radiator pressure below a normal level.

3. The structure of claim 1, and a flasher device electrically connected with the indicator light, s aid light and flasher device both connected in parallel with said audible signal device.

4. The structure of claim 3, and the audible signal device comprising a buzzer.

5. The structure of claim 1, and an automatic system operability testing circuit connected into said circuit means and connected with the main ignition switch of the ignition circuit and including a relay.

6. The structure of claim 5, and a separate and independent system operability test switch in the driver's compartment of the vehicle equipped with the system and manually operable at any time to test the operability of the system, said manual test switch electrically connected into said circuit means.

7. A device for indicating the pressure condition in the radiator of a liquid cooled engine system above and below prescribed limits comprising high and low radiator pressure sensing switches on the radiator in pressure communication therewith, electrical indicator means remote from the radiator and switches to indicate a pressure condition in the radiator above or below prescribed limits, and electrical circuitry interconnecting said switches and indicator means and operable to energize the indicator means when either of said switches is closed, both of said switches normally open when said prescribed pressure prevails in said radiator.

8. The structure of claim 7, and said high-pressure-sensing switch on said radiator being open at all times and under all conditions of pressure in the radiator except excessive pressure above said prescribed limits, the low-pressure-sensing switch on the radiator being open by said prescribed pressure or excessive pressure and closing only under the influence of pressure below the prescribed limits.

9. The structure of claim 7, and a temperature-sensing switch on said engine to sense the temperature of the coolant liquid and interposed below said high- and low-pressure-sensing switches and said indicator means and being open until the coolant liquid reaches a normal operating level at which time the low pressure sensing switch will have opened due to the existence of normal radiator pressure and both said switches will remain open until radiator pressure is above or below prescribed limits.

10. The structure of claim 9, and a connection on the temperature-sensing switch adapted to extend to a conventional high-pressure indicator light on the instrument panel of an automobile.

* * * * *